June 19, 1962 V. J. BUSCEMI 3,039,283
METHOD OF ORNAMENTING GLASS
Filed Nov. 8, 1960

INVENTOR.
Vincent J. Buscemi
BY
Norman N. Popper
Attorney

United States Patent Office 3,039,283
Patented June 19, 1962

3,039,283
METHOD OF ORNAMENTING GLASS
Vincent J. Buscemi, 505 E. 82nd St., New York, N.Y.
Filed Nov. 8, 1960, Ser. No. 68,077
3 Claims. (Cl. 67—22.5)

My invention relates generally to a method of ornamenting glass, and particularly to a method of ornamenting glass cylinders.

It is among the objects of my invention to provide a glass cylinder candle having either, or both, of a uniform light penetrable ornamentation and a limited area ornamentation which is either light penetrable or opaque.

It is another object of my invention to provide a method for the uniform application of ornamentation to a glass cylinder candle.

Yet another object of my invention is to provide a method for applying an adhesive dress to a glass cylinder candle.

Among the further objects of my invention is to provide a method for ornamenting glass cylinder candles which is relatively inexpensive, may be practiced by unskilled labor, is easy to practice, and produces an aesthetically pleasing appearance or display on a light penetrable glass cylinder.

These objects and advantages as well as other objects and advantages may be achieved by the method and article illustrated in the drawings in which.

Figure 1:
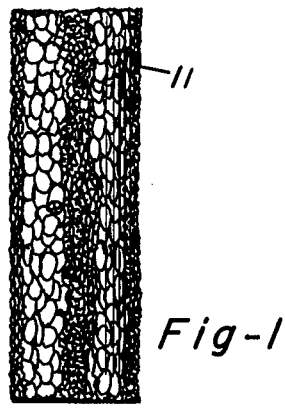
FIGURE 1 is a side elevational view of an ornamented glass cylinder candle.
Figure 2:
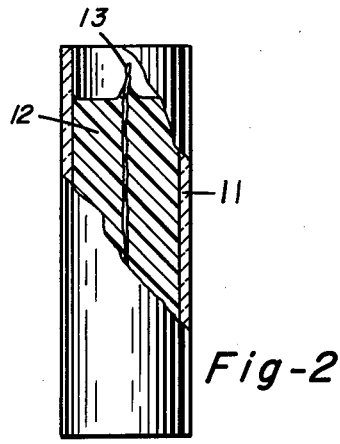
FIGURE 2 is a similar view with part of the wall exploded away.
Figure 3:
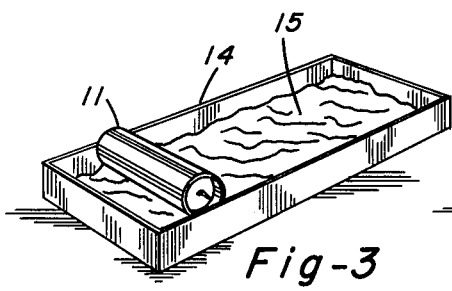
FIGURE 3 is a perspective view of an adhesive tray with a glass cylinder in it.
Figure 4:
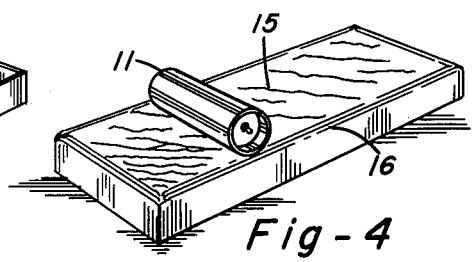
FIGURE 4 is a perspective view of an adhesive pad with a glass cylinder in it.
Figure 5:
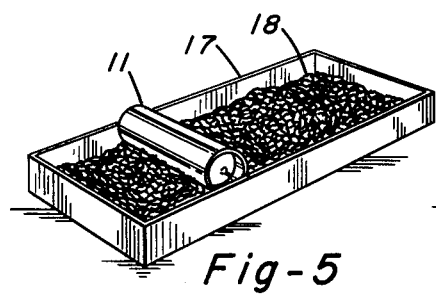
FIGURE 5 is a perspective view of a tray of display material with a partially coated glass cylinder in it.
Figure 6:
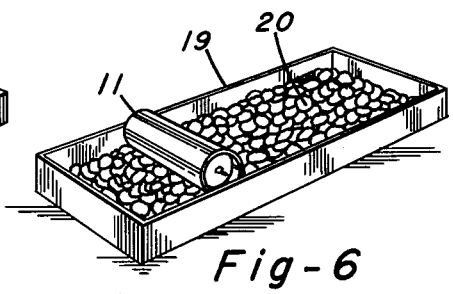
FIGURE 6 is a second view of a tray of display material with a partially coated glass cylinder in it.

A candle in a clear or colored glass cylinder presents a stark, unaesthetic appearance, and is an unattractive table ornament. To impart an ornamental appearnce to such a candle presents problems. The mere use of a colored glass cylinder is not enough to give the candle sufficient decorative appeal. A method for the application of ornamental pieces to candles of this kind is not known. If a mixture of display material and an adhesive material is prepared, it is difficult to apply it to the exterior of the glass cylinder, and when so applied, the distribution of the display articles of material is uneven and unattractive, since it results from haphazard distribution of the display articles throughout the adhesive medium. The heat generated by the candle may also cause a detachment of the display material as well as the adhesive film. The following procedures overcome these problems and other incidental problems and provide a glass cylinder candle of high ornamental value.

A cylinder 11 approximately 9" high and 2¾" in diameter will be used to illustrate the type of ornamental illuminative device involved. This cylinder may be of glass, or of some other material relatively resistant to deterioration when exposed in proximity to a candle flame. The cylinder may be transparent, translucent, clear, or colored uniformly or in specific areas.

The inside of the cylinder 11 is first filled with candle wax 12 with a central axial candle wick 13. A tray 14 having generally the width of the glass cylinder 11 candle is used. This tray shall be slightly longer than the circumference of the glass cylinder. A thin layer of adhesive 15 material is deposited in the tray. An alternative procedure is to provide a mat 16 or pad of absorbent material such as cheese cloth or cocoa fibre matting which is heavily impregnated with adhesive 15. The glass cylinder 11 is then placed in the tray 14 (or on the mat 16) and rolled over the surface of the tray or mat in a careful, slow and even manner to pick up a uniform coating of adhesive 15. If a mat 16 is used instead of a tray, the cylinder should be lightly pressed to cause the mat to exude the adhesive 15 in sufficient quantity to coat the surface of the cylinder. The coated glass cylinder 11 is then removed from the tray or mat, and the decorative particles are applied.

A shallow tray 17 is provided for the decorative material. Assuming that the display particles are glass beads 18, they are deposited in the tray. The adhesive coated glass cylinder 11 is placed on the bed of glass beads 18 in the tray and rolled a distance equal to its entire circumference. The glass beads will adhere in a uniform dress evenly over the entire surface and the adhesive will tend to surround the beads 18 on all sides.

An additional coat of ornamental display material may also be applied over the first coat. This may be done by rolling the cylinder in a second tray 19 of differing display material such as sequins 20. Since the adhesive has primarily been used to pick up the first layer, adherence of the second layer will be much sparser. It may be uniform over the entire surface of the cylinder 11, or only at intervals, if operator lifts and turns the cylinder so as to bring the surface into contact with the second tray 19 of display material at intervals of 90° on the surface of the cylinder 11.

Numerous applications of display materials will suggest themselves, such as a background of transparent blue beads with an occasional overlay of tinsel silver stars, a background of sea green translucent beads with an overlay of silver, deep green or grey fish and seahorses, a background of green petal shaped particles and an overlay of daisy blooms or the like, etc. The combinations are unlimited to the wide ranging imagination.

The adhesive used should have a latex-like consistency and should rapidly set to a non-tacky state. There are numerous compositions which have this quality; they are any polyvinyl base adhesive which become non-tacky after a brief period of time, e.g. a polyvinyl acetate emulsion. After the foregoing steps, the glass cylinder candle is set aside standing upright to allow the adhesive to dry and set, so that the display materials are firmly attached. The candle is then ready for use.

The foregoing description is intended merely to be illustrative of an embodiment of the invention for many changes may be made in the article and the method of preparing it within the scope of the claims without departing from the spirit of the invention.

What is claimed:

1. An ornamental candle comprising a light-penetrable cylinder, a candle in the cylinder, a coat of adhesive on the cylinder, a relatively dense first layer of display material attached to the adhesive coat, a second layer of display material substantially less dense than the first layer and attached to portions of the adhesive coat not previously attached to the first layer of display material.

2. A method of ornamenting glass cylinder candles comprising preparing a latex-like adhesive, spreading the adhesive over a generally flat bed approximately as wide as the cylinder is long and having a length at least equal to the circumference of the cylinder, rolling a glass cylinder candle in the flat bed of adhesive to spread it over the cylinder's outside surface, preparing a generally flat bed of loosely distributed particles of display material, rolling the adhesive coated outside surface of the cylinder over the bed of display material to evenly coat the surface thereof in one revolution.

3. A method of ornamenting glass cylinder candles comprising preparing a latex-like adhesive, spreading the adhesive over a generally flat bed approximately as wide as the cylinder is long and having a length at least equal to the circumference of the cylinder, rolling a glass cylinder candle in the flat bed of adhesive to spread it over the cylinder's outside surface, preparing a first generally flat bed of loosely distributed particles of display material, the said bed having dimensions substantially the same as the said bed of adhesive, rolling the adhesive coated outside surface of the cylinder over the first bed of display material to evenly coat the surface thereof with a relatively dense layer of display material, rolling the adhesive coated outside surface over a second bed of display material to evenly coat the surface thereof with a substantially less dense second coat of display material attached to portions of the adhesive not attached to the first coat.

References Cited in the file of this patent

UNITED STATES PATENTS

| | | |
|---|---|---|
| 2,274,823 | Candy | Mar. 3, 1942 |
| 2,496,070 | Selsky | Jan. 31, 1950 |
| 2,821,802 | Glaser | Feb. 4, 1958 |
| 2,946,911 | Malinowski et al. | July 26, 1960 |